Nov. 19, 1957 A. J. NICHOLAS ET AL 2,814,002
HIGH VOLTAGE SWITCHING INSTALLATIONS
Filed Aug. 24, 1953 2 Sheets-Sheet 1

INVENTORS
ALFRED J. NICHOLAS
RONALD N. BUTTREY
BY
Holcombe Wetherill & Brisebois
ATTORNEYS Nov. 19, 1957    A. J. NICHOLAS ET AL    2,814,002
HIGH VOLTAGE SWITCHING INSTALLATIONS
Filed Aug. 24, 1953    2 Sheets-Sheet 2
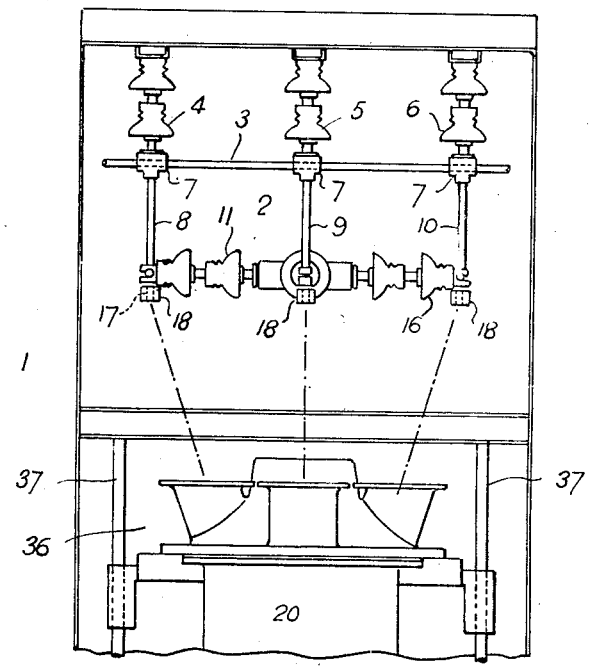
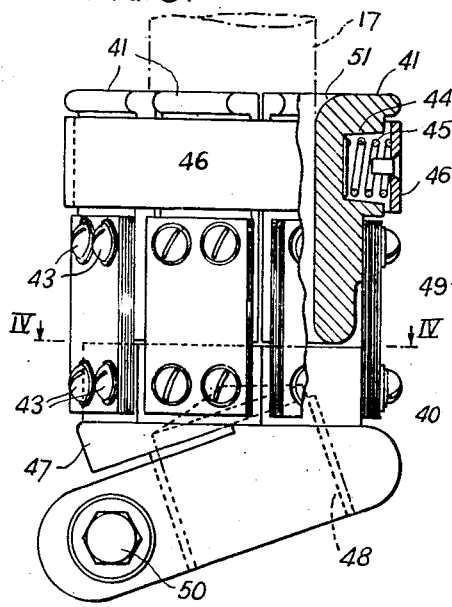
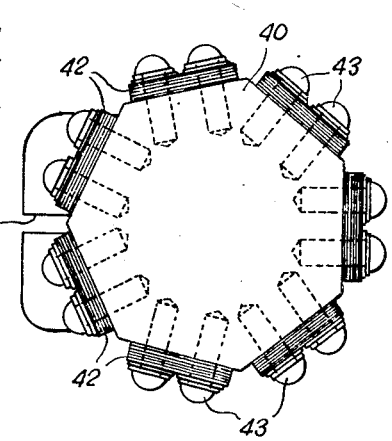
INVENTORS
ALFRED J. NICHOLAS
RONALD N. BUTTREY
BY
Holcombe Wetherill & Brisebois
ATTORNEYS

United States Patent Office 2,814,002
Patented Nov. 19, 1957

2,814,002
HIGH VOLTAGE SWITCHING INSTALLATIONS

Alfred James Nicholas, Machen, and Ronald Norton Buttrey, Newport, England, assignors to South Wales Switchgear Limited, Blackwood, England Application August 24, 1953, Serial No. 376,182
Claims priority, application Great Britain August 28, 1952
3 Claims. (Cl. 317—103)

This invention relates to high voltage metal clad switching installations and is more particularly concerned with the connection of circuit breaker terminals to bus bars and associated feeder conductors.

The connections referred to may be effected by so called horizontal or vertical isolation units in which the bus bars and insulators are housed. In vertical isolation units, the fixed bus-bar and feeder (or other) connections are provided with contacts which are automatically engaged by contacts mounted at the upper ends of the circuit breaker terminals, the circuit breaker being raised bodily to effect connection of the co-operating contacts. Indoor metal clad units used for circuits or up to 11 kv. may have air insulated bus-bars and connections, the terminal bushings being parallel to each other, alternatively, and for higher voltages the bus-bar and connection housings are usually filled with an insulating medium such as oil or compound. It is usual also to provide insulating orifice tubes or sleeves for the co-operating contacts in the unit.

The object of the present invention is to enable vertically isolating metal clad equipment, with air insulation of bus bars and connections, to be used for higher voltage circuits e. g. greater than 15 kv. than has hitherto been the case, thus effecting economy in the use of insulating material and maintenance time.

By "air insulation" it is intended to indicate that the major part of the primary insulation of the bus bars and connections of the equipment is air although the said bus bars and connections are supported by solid insulators such as for example porcelain insulators. It is not intended to exclude the use of additional solid insulating shrouds or barriers to assist in increasing the flashover strength between conductors and earth nor the use of metal cowlings to modify the electrical field stress distribution.

According to the present invention, in an air insulated high voltage vertical isolating switching equipment, a circuit breaker having splayed terminal bushings is employed and the terminals are provided with contacts adapted to receive vertically downwardly extending isolating contacts.

The invention will now be described with reference to the accompanying drawings illustrating an air insulated isolating switch unit intended for use with circuits having a voltage of 33 kv.

In the drawings:

Fig. 2 is an end elevation of the interior of the rear part of the unit, the lower portion being broken away.

Fig. 3 is an elevation partly in section of an isolating contact, drawn to an enlarged scale.

Fig. 4 is a section taken along the line IV—IV of Fig. 3, and

Figure 1:
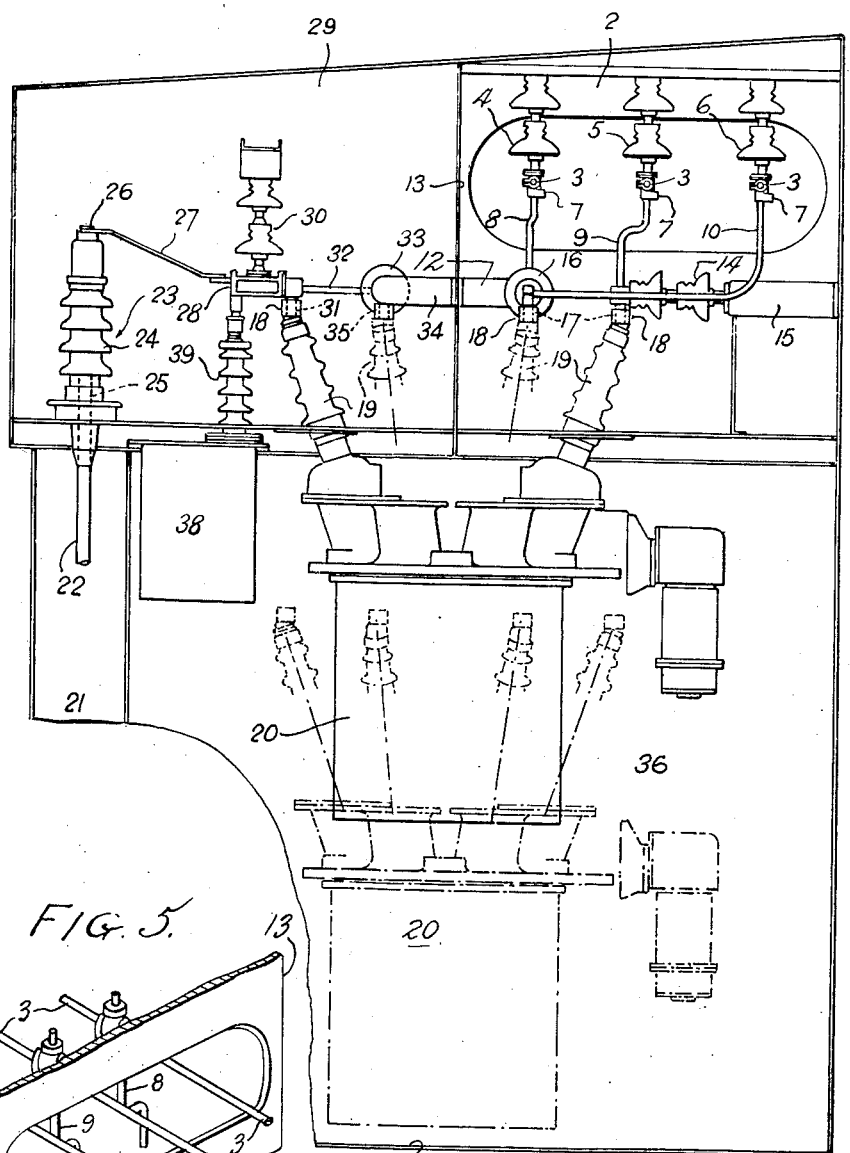
Fig. 1 is a side elevation of the unit, the side of the housing of the unit being omitted to show details of construction.
Figure 5:
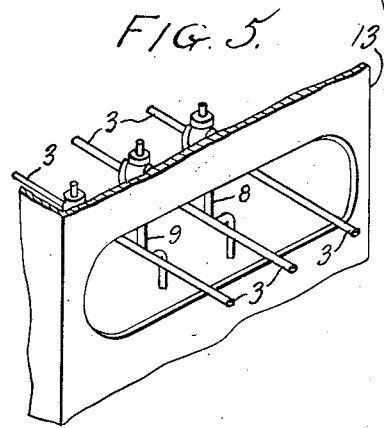
Figure 5 is a perspective view showing the bus bars 3 as they enter the chamber 2.

The general construction of the housing of the unit is similar to that of the known air insulated units operating at 11 kv. and comprises a framework indicated generally at 1 to which is secured in known manner sheet metal panels to form a partially closed metal clad housing including a bus bar chamber 2 extending across the rear of the unit and in which one or both sides are left unclosed to permit the passage of bus bars 3 into the unit. The bus bars 3 are supported from the roof of the chamber 2 by porcelain cap and pin insulating units 4, 5 and 6, there being thus one insulating unit for each bus bar, the said units being positioned in transverse stepped relation from the front to the rear of the chamber 2.

The bus bars are secured to the cap and pin units by means of brackets 7 to which brackets there are also secured downwardly extending connecting bars 8, 9 and 10, respectively. The connecting bar 8 extends downwardly substantially vertically and is supported at its lower end by a cap and pin insulator unit 11 secured to a bracket 12 extending into the chamber 2 from the front end wall 13 of the chamber. The connecting bar 9 extends downwardly and slightly forwardly and is supported at its lower end by a cap and pin insulator unit 14 secured by a bracket 15 to the rear wall of the chamber 2 while the connecting bar 10 extends downwardly and then forwardly to be supported by a cap and pin insulator unit 16 secured to the bracket 12 opposite to the cap and pin unit 11.

Each connecting bar is provided at its lower end with a downwardly extending isolating contact member 17 adapted to engage in a female type isolating socket 18 mounted in a manner hereinafter described upon the upper end of the terminal bushing 19 of a circuit breaker housing 20.

The isolating contacts are thus left completely free in air without insulating cover of any kind.

The unit is provided at its forward end with a feeder compartment 21 through which a feeder cable 22 passes upwardly to cable sealing ends indicated generally at 23, there being one sealing end for each phase. Each sealing end 23 comprises a tubular insulating bushing 24 into which the exposed and prepared end 25 of the cable 22 is sealed, the said end of the cable being connected by a conductor running through the bushing to a terminal 26 of the upper end of the cable sealing end. The three cable sealing ends 23 are spaced apart transversely of the unit and from the upper terminal 26 of each sealing end a connector 27 extends to a bracket 28 supported from the roof of a feeder chamber 29 by a cap and pin insulator unit 30. The cap and pin units 30 are thus likewise spaced transversely of the feeder chamber 29 and the bracket 28 supported by the centre unit 30 is provided with a downwardly extending isolating contact member 31. The brackets supported by the two outer units 30 have secured thereto a connector bar 32 which extends rearwardly to be supported by laterally extending cap and pin units 33 supported upon a bracket 34 extending forwardly from the wall 13, the connector bars 32 terminating in downwardly extending isolating contact members 35. The isolating contact members 31 and 35 are similar to the contact members 17 in the bus bar chamber 2 and in like manner are adapted to engage in the female socket 18 at the upper end of the terminal bushings 19.

The circuit breaker is of the enclosed, oil immersed type and the housing 20 is slidably supported in known manner within a circuit breaker compartment 36 between spaced uprights 37 (Fig. 2) secured to the base of the framework 1 and extending upwardly therefrom. Known means (not shown) such as for example an electric motor operated mechanism is provided for raising and lowering the circuit breaker housing 20 and suitable interlocking devices including a shutter mechanism (not shown) are provided to ensure correct operation of the unit.

Suitable current transformers (not shown) are positioned within the circuit breaker housing 20 which is provided with a sealing outlet (not shown) for the low tension leads from the said transformers.

The top of the circuit breaker housing 20 supports the terminal bushings 19 through each of which a connector passes from the socket 18 mounted on the top of the bushing to the interior of the housing, there being two sets of three such terminal bushings arranged in outwardly splayed-apart relation as indicated in broken line in Fig. 1 so that the sockets at the upper ends of one set of three bushings are in vertical register with the isolating contact members 17 positioned within the bus bar chamber 2 and the sockets at the upper ends of the other set of three bushings are in vertical alignment respectively with the isolating contact members 31 and 35 positioned within the feeder chamber 29.

The circuit breaker positioned within the housing 20 thus serves to connect the feeder cable 22 to the bus bars 3 and is vertically movable into and out of engagement with the isolating contact members 17, 31 and 35 to connect the feeder cable to, or to isolate the feeder cable from the bus bars 3.

Measurement of voltage is achieved in the arrangement shown by a vertically isolatable voltage transformer 38 positioned to the front of the circuit breaker and provided with upwardly extending terminals 39 adapted releasably to engage the brackets 28. The voltage transformer is made of such dimensions that it can be lowered and removed from beneath the circuit breaker when the circuit breaker is in the raised position.

Referring now to Figures 3 and 4 of the drawings, it will be seen that the isolating socket 18 comprises a heptagonal base 40 upon which seven contact segments 41 are individually supported by resilient laminated connecting straps 42 extending upwardly from the base, each strap 42 being secured to one side edge of the base and to one contact segment 41 respectively by screws 43.

Each segment 41 is provided at its upper end with a recess 44 in which is positioned a compression spring 45 engaging at one end with the base of the recess and at the other end with a ring like member 46 surrounding and spaced from the contact segments 41, the segments being thus urged inwardly into engagement with for example an isolating contact 17 (shown in broken line) to ensure an adequate electrical connection between the segments and the contact 17.

The base 40 has formed integral therewith a downwardly extending portion 47 having a bore 48 extending upwardly from the lower surface thereof. The bore 48 is adapted to receive the upper end of the connector passing through the terminal bushing 19 and to be secured thereto, for which purpose the said portion 47 is provided with a slot 49 extending from the bore to the outer surface of the portion 47, and a nut and bolt 50 extending through the said portion transversely of the slot so that by tightening the nut and bolt 50, the bore 48 contracts to grip the said connector.

The bore 48 is inclined with respect to the axis of the base 40 at an angle equal to that at which the bushings 19 are inclined with respect to the vertical so that when the bore 48 is engaged on the connector of the bushing, the segments 41 extend vertically upwards to engage the isolating contact member 17.

The upper, inner edge of each contact segment 41 is outwardly curved as at 51 to facilitate the engagement of the isolating contact member within the socket when the circuit breaker is raised from its lowered position and the socket 18 moved vertically towards the member 17 into engagement therewith.

It will be understood that the invention is not limited to the above described embodiment thereof and that specific details of construction may be modified without departing from the scope of the invention as defined in the appended claims. Thus for example, the current transformers instead of being mounted within the circuit breaker, may be supported upon an exterior surface of the breaker, or other suitable part of the unit. The insulator units although specifically shown and described as cap and pin insulator units may be of any suitable type such as for example post type insulator units.

We claim:

1. An air insulated metal-clad high voltage vertical isolating unit comprising a metal clad housing, a busbar chamber within said housing, a framework having metal panels secured thereto and forming the said housing and busbar chamber, an end wall to said busbar chamber, an aperture in said end wall, busbars supported upon insulators in said busbar chamber and extending freely through the said aperture in spaced relation therewith, a plurality of air insulated downwardly extending isolating contact members supported upon insulators within said housing and connected to the busbars, a circuit breaker, a housing for said circuit breaker supported within said metal-clad housing below the said isolating contact members for vertical movement with respect thereto, splayed apart terminal bushings supported on said circuit breaker housing and extending upwardly therefrom and contact means on said terminal bushings for releasably engaging the said isolating contact members upon upward vertical movement of the circuit breaker housing.

2. An air insulated metal-clad high voltage vertical isolating unit comprising a metal-clad housing including a framework and sheet metal panels secured thereto, means dividing said housing into an upper portion and a lower portion, a busbar chamber and a feeder chamber in said upper portion, opposed end walls to the said busbar chamber, an aperture in each of the said end walls, busbars supported in the busbar chamber and extending freely through the said apertures in spaced relation therewith, feeder cable connectors in the said feeder chamber, means supporting the said connectors on the said framework in spaced relation therewith, a plurality of air insulated downwardly extending isolating contact members in the said upper portion of the housing, insulators supporting said contact members upon the framework in spaced relation therewith, means separately connecting each of the said contact members with a busbar or a feeder cable connector respectively, a circuit breaker, a housing for said circuit breaker supported in the said lower portion of the housing for vertical movement towards and away from the busbar and feeder chambers, splayed apart terminal bushings supported upon said circuit breaker housing and extending upwardly therefrom, and contact means on said terminal bushings for releasably engaging the said isolating contact members upon upward vertical movement of the circuit breaker housing towards the busbar and feeder chambers.

3. An air insulated metal-clad high voltage vertical isolating unit as claimed in claim 2 in which the said contact means on the terminal bushings each comprises a contact socket adapted to engage over the corresponding isolating contact member and including a base, a plurality of contact elements disposed around the base and extending upwardly therefrom, means resiliently securing the contact elements on the base, a downwardly extending bore in said base, and an opening in the lower end of said bore for mounting the base on the terminal bushing, the said bore being inclined with respect to the axis of the socket so as to support the socket substantially vertically on the terminal bushing.

References Cited in the file of this patent

UNITED STATES PATENTS

| 1,740,558 | Ainsworth | Dec. 24, 1929 |
| 1,878,999 | Ainsworth | Sept. 27, 1932 |
| 1,929,983 | MacNeil | Oct. 10, 1933 |
| 2,353,518 | Specht | July 11, 1944 |
| 2,379,188 | Rugg | June 26, 1945 |
| 2,600,304 | Krida | June 10, 1952 |
| 2,645,699 | Goodwin | July 14, 1953 |